April 15, 1969   P. J. SPANGLER   3,438,129
CUTTING TOOL
Filed Dec. 27, 1966
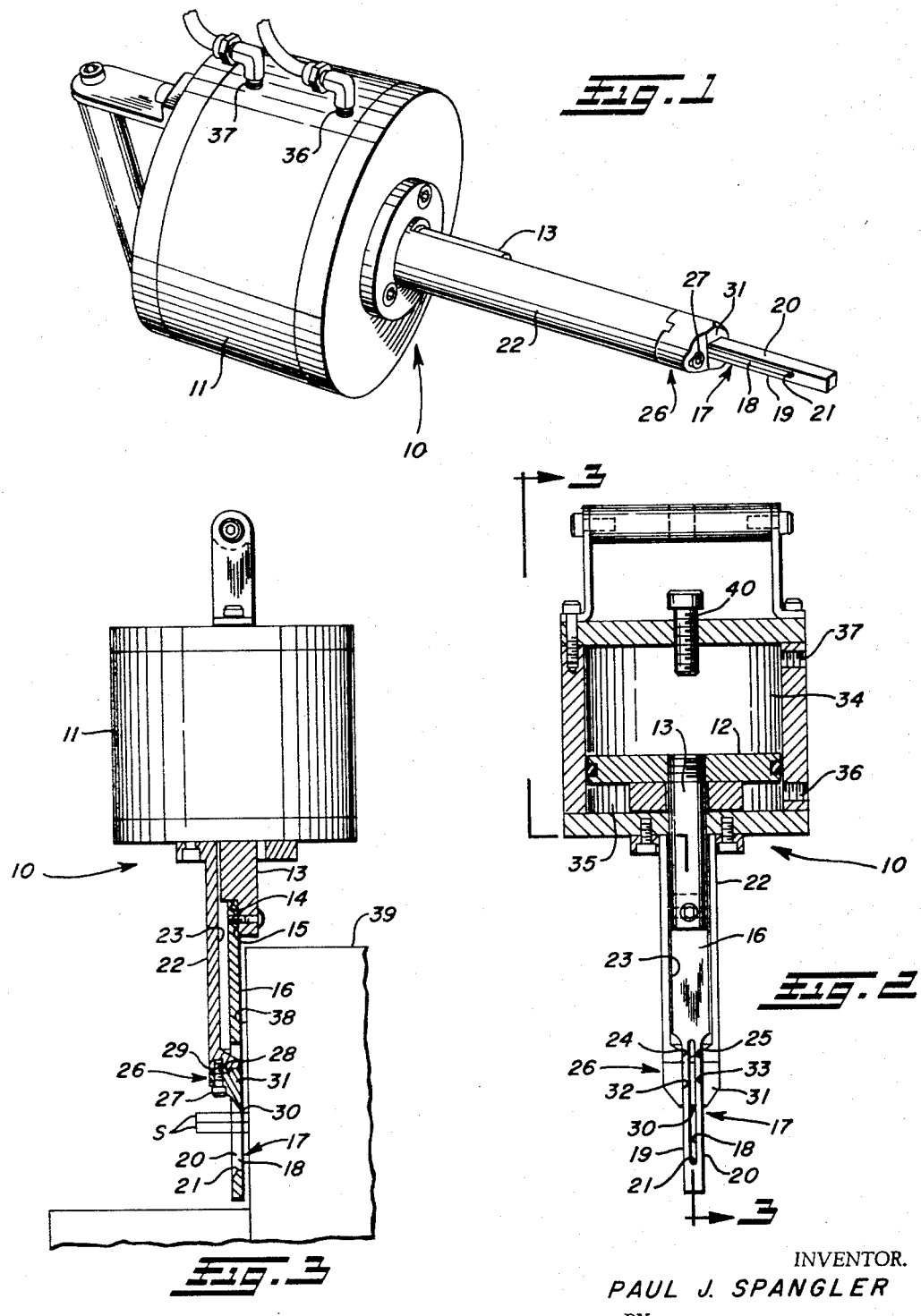
INVENTOR.
PAUL J. SPANGLER
BY
McNenny, Farrington, Pearne & Gordon
ATTORNEYS United States Patent Office 3,438,129
Patented Apr. 15, 1969

3,438,129
CUTTING TOOL
Paul J. Spangler, University Heights, Ohio, assignor to ETC Incorporated, Cleveland, Ohio, a corporation of Ohio
Filed Dec. 27, 1966, Ser. No. 604,864
Int. Cl. B26b 17/00; B26d 5/08, 5/12
U.S. Cl. 30—180                                    4 Claims

ABSTRACT OF THE DISCLOSURE

A cutting tool having a power cylinder and a piston rod driven by the cylinder. A yoke member is fixed to one end of the piston rod and has an elongated longitudinal slot therein. A housing member is fixed to the power cylinder and guidingly supports the piston rod and its yoke member. An anvil is provided on either the yoke member or on the housing member. A cutting edge is provided on the other member so that when the piston rod is in an extended position, the cutting edge is spaced from the anvil and while the piston rod is being retracted, the cutting edge and anvil are moved toward each other.

---

This application relates to cutting tools and, more particularly, to fluid operated cutting tools. This invention is particularly concerned with an in-line cutting tool wherein the workpiece is retained in an anvil portion of the tool and is severed by relative movement between the anvil portion of the tool and a cutting blade.

Cutting tools of the in-line type generally comprise an anvil portion which is mounted or fixed relative to a power cylinder. A cutting blade is mounted on the end of a piston rod which, in turn, is fixed to a piston within the power cylinder of the tool. A workpiece to be severed is inserted within the anvil portion of the tool and is severed by the cutting tool upon the application of fluid pressure to the power cylinder. Such tools, if they are to cut relatively thick workpieces, must be designed so that the cutting blade has a relatively large cross sectional area, since the power cylinder of the tool must push the cutting blade into the workpiece against the anvil. The cutting tool assembly, therefore, is placed in compression and the compressive forces exerted on the cutting tool must be resisted by relatively thick sections of the cutting tool assembly.

Such tools are, in general, satisfactory for cutting operations wherein the piece that is to be cut is located in a relatively accessible position. In many operations, however, the piece to be cut is located in a position which is not easily accessible and wherein conventional plier type or conventional in-line type cutting tools will not function satisfactorily.

An example of a difficult cutting operation is a cutting operation which is performed during the manufacture of the rotors of large electric motors. During the assembly of such rotors, it is necessary to cut relatively thick shunt wires which project from the riser face of the rotor just above the commutator surface. These wires are flat, elongated wires having a rectangular cross section and project in a closely spaced circular array from the riser face. Since these wires are closely spaced in their concentric array, it is impossible to cut such wires with conventional plier type cutters since the cutting blades must be inserted within the narrow space between three adjacent wires to cut the middle wire or wires. If the plier type blades were designed thin enough to enter such narrow spaces, their cross section would be insufficient to supply an effective cutting force to the wire. Conventional in-line type cutting tools have proved inadequate in such an instance since the application of a compressive force to the necessarily relatively thin blade tends to buckle the blade and/or its driving piston. The conventional method of cutting such projecting wires is to drive wooden wedges in each space between the projecting wires, mount the rotor in a lathe, and then sever the wires with the cutting tool of the lathe.

The present invention eliminates this tedious severing operation by providing an in-line cutting tool having a relatively thick sectioned cutting blade which is fixed to a power cylinder and an anvil which is moved relative to the cutting blade by a piston within the power cylinder. According to another aspect of this invention, the anvil may be fixed relative to the power cylinder with the cutting blade movable relative to the anvil and power cylinder. According to this aspect of the invention, the cutting blade is mounted on a relatively thin sectioned member but that member is placed under tension rather than compression during the operation of the tool.

The cutting tool according to this invention exerts compressive forces on tool elements having relatively thick cross sections and exerts tensile forces on those elements having relatively thin cross sections to minimize buckling or failure of elements having such thin cross sections.

Other objects, features, and advantages of the invention will become more apparent and more readily understood from the following detailed description of the invention and from the accompanying drawings.

In the drawings:

FIGURE 1 is a perspective view of a tool in accordance with the present invention;

FIGURE 2 is a rear elevational view of the cutting tool shown in FIGURE 1, showing the tool in a position for severing the shunt wires on a rotor which is shown in phantom outline in that figure; and, FIGURE 3 is a cross sectional view, the plane of the section being indicated by the line 3—3 in FIGURE 2.

Referring now to the drawings, a cutting tool 10 is illustrated. The cutting tool 10 includes a double acting power cylinder 11 having a piston 12 slidably mounted therein. The piston 12 is provided with a piston rod 13.

The lower end of the piston rod 13 is provided with a stepped portion 14 and a flat face 15 which receives a flat piston rod extension member 16. The extension member 16 has a lower end which comprises a yoke portion 17 having a longitudinal slot 18 formed therein. The slot 18 defines a pair of work supporting tension elements 19 and 20 and a lower anvil portion 21, all of which are movable with the piston 12 and its piston rod 13.

The piston rod 13 and its extension member 16 are substantially encased by a semicylindrical blade support housing 22 which is fixed at its upper end to the power cylinder 11. The blade support housing 22 has a semicylindrical inner surface 23 which guides the piston rod 13 and the member 16 during their stroke. The lower end of the housing 22 is provided with parallel, longitudinal slots 24 and 25 which guidingly receive the tension members 19 and 20.

The lower end of the housing 22 is further provided with a replaceable cutting blade member 26. The cutting blade member 26 is removably attached to the lower end of the housing 22 by a machine screw 27 and is restrained from rotational movement relative to the housing 22 by a slot 28 which receives a projecting portion 29 of the housing 22. The blade member 26 has a semicylindrical upper outer surface which corresponds to the semicylindrical outer surface of the housing 22.

The lower end of the cutter blade member 26 is tapered from the semicylindrical upper end of the member 26 diagonally downwardly to provide a relatively sharp cutting blade 30 at a flat rear side 31 of the cutter 26. The cutter 26 is further provided with a pair of parallel, longitudinal extending slots 32 and 33 in its flat side 31. The slots 32 and 33 are respectively aligned with the slots 24 and 25 in the lower end of the housing 22 and the slots 32 and 33 guidingly receive the tension members 19 and 20. The portion of the cutting edge 30 between the tension members 18 and 19 comprises the effective cutting blade of the member 26 since it is that portion of the edge 30 which performs the actual cutting operation in a manner which will now be explained.

The piston 12 divides the power cylinder 11 into a first pressure chamber 34 and a second pressure chamber 35. Fluid pressure may be admitted to or exhausted from the chamber 35 through a port 36 and, similarly, fluid pressure may be admitted to or exhausted from the chamber 34 through a port 37.

The tool 10 may be employed to sever shunt wires S which project from the riser face 38 of a rotor 39. To accomplish this severing operation, the yoke portion 17 of the tool is slipped over the shunt wires S so that the wires protrude through the slot 18 and are supported on either side by the tension members 19 and 20. Fluid pressure is then admitted to the pressure chamber 35 through the port 36 and fluid pressure is exhausted from the pressure chamber 34 through the port 37 to, thereby, drive the piston 12 and its rod 13 upwardly. Upward movement of the piston rod 13 draws the yoke portion 17 upwardly until the anvil 21 engages the bottom most wire S. When the anvil 21 engages the bottom most wire S, further upward movement of the piston 12 causes the blade edge 30, the housing 22, and therefore, the cylinder 11 to progress downwardly so that the edge 30 slices through the projecting wires S.

During this severing operation, elements of the tool 10 having relatively thin cross sections (the members 19 and 20, and the member 16) are subjected to tensile forces, and the elements of the tool 10 having relatively thick cross sections (the housing 22 and the cutting member 26) are subjected to compressive forces, thus minimizing any tendency of elements having thin cross sections to buckle under the application of compressive forces thereto.

It should further be noted that during the cutting operation, there is no interference between tool elements and portions of the rotor 39. For example, the spacing between the lower end of the piston rod 13 and the cylindrical surface of the rotor 39 remains constant during the cutting operation.

In order to eliminate bottoming of the cutting edge 30 of the anvil 21, a stroke adjustment, which comprises an adjustable stop member 40, may be provided in the cylinder 11. The adjustable stop 40 comprises a threaded screw which projects into the chamber 34 to permit the piston 12 to be adjustably stopped during its upward movement to thereby prevent any substantial degree of contact between the cutting blade 30 and the anvil 21.

According to a further aspect of the invention, the lower anvil portion may be sharpened to comprise a movable cutting blade and the cutting blade may be flattened to comprise a fixed anvil. In this case, however, thin sectioned members are still placed in tension and thick sectioned members are still placed in compression during the operation of the tool.

The invention is not restricted to the slavish limitation of each and every one of the details set forth above. Obviously, devices may be provided which change, eliminate, or add certain details without departing from the scope of the present invention.

What is claimed is:

1. A cutting tool comprising a power cylinder, a piston mounted in said cylinder, a piston rod fixed to said piston, said piston rod having a yoke portion at one end, said yoke portion comprising means defining an elongated longitudinal slot, a housing fixed to said power cylinder and guidingly supporting said piston rod and its yoke portion, a cutting blade mounted on one end of said housing and having a cutting edge substantially transverse to the elongated slot in said yoke portion, said cutting edge being located adjacent one end of said slot when said piston rod is in an extended position relative to said power cylinder and traversing substantially the longitudinal extent of said slot as said rod is retracted within said cylinder.

2. A cutting tool according to claim 1 wherein said yoke portion has cross sectional areas which are substantially less than the cross sectional areas of said housing.

3. A cutting tool comprising a power cylinder, a piston mounted in said cylinder, a piston rod fixed to said piston, said piston rod having a yoke member at one end, said yoke member comprising means defining an elongated longitudinal slot, a housing member fixed to said power cylinder and guidingly supporting said piston rod and its yoke member, one of said members having a cutting blade and the other of said members defining an anvil portion, said cutting blade having a cutting edge which is substantially transverse to the elongated slot in said yoke portion and which is opposite said anvil portion so that, when said piston rod is in an extended position, the cutting edge is spaced from the anvil portion and, while said rod is being retracted, the cutting edge and anvil portion are moved toward each other.

4. A cutting tool according to claim 3 wherein said yoke portion has cross sectional areas which are substantailly less than the cross sectional areas of said housing.

References Cited

UNITED STATES PATENTS

| 2,714,250 | 8/1955 | Twedt | 30—180 |
| 2,823,454 | 2/1958 | Kirchner | 30—241 |
| 3,320,669 | 5/1967 | Chandler et al. | 30—228 |
| 3,343,533 | 8/1967 | Davis | 83—566 X |

JAMES M. MEISTER, *Primary Examiner.*

U.S. Cl. X.R.

83—566, 580, 639